(12) United States Patent
Erben et al.

(10) Patent No.: US 7,524,590 B2
(45) Date of Patent: Apr. 28, 2009

(54) METHODS FOR STORING HOLOGRAPHIC DATA AND ARTICLES HAVING ENHANCED DATA STORAGE LIFETIME DERIVED THEREFROM

(75) Inventors: Christoph Georg Erben, Clifton Park, NY (US); Eugene Pauling Boden, Scotia, NY (US); Xiaolei Shi, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 453 days.

(21) Appl. No.: 11/296,246

(22) Filed: Dec. 7, 2005

(65) Prior Publication Data

US 2007/0127329 A1   Jun. 7, 2007

(51) Int. Cl.
*G03H 1/02* (2006.01)
(52) U.S. Cl. .................. 430/1; 430/2; 359/3
(58) Field of Classification Search .......... None
See application file for complete search history.

(56) References Cited

U.S. PATENT DOCUMENTS

| | | | |
|---|---|---|---|
| 3,850,633 A | | 11/1974 | Moraw et al. |
| 5,102,771 A | * | 4/1992 | Vogel et al. ............ 430/270.1 |
| 6,162,579 A | * | 12/2000 | Stengel et al. .......... 430/272.1 |
| 2003/0044690 A1 | * | 3/2003 | Rotto ........................... 430/1 |
| 2004/0211917 A1 | * | 10/2004 | Adamovics .............. 250/474.1 |
| 2004/0245432 A1 | * | 12/2004 | Takizawa ................ 250/208.1 |
| 2005/0003133 A1 | * | 1/2005 | Akiba et al. ............... 428/64.2 |
| 2005/0019711 A1 | * | 1/2005 | Takizawa ..................... 430/561 |
| 2005/0046915 A1 | * | 3/2005 | Takizawa et al. ............ 359/3 |
| 2005/0058910 A1 | * | 3/2005 | Takizawa et al. ............. 430/1 |
| 2005/0136333 A1 | | 6/2005 | Lawrence et al. |
| 2005/0214650 A1 | * | 9/2005 | Takizawa et al. ............ 430/1 |
| 2005/0221198 A1 | * | 10/2005 | Takizawa et al. ............. 430/1 |
| 2005/0233246 A1 | | 10/2005 | Boden et al. |

(Continued)

FOREIGN PATENT DOCUMENTS

EP         460647      *   6/1991

(Continued)

OTHER PUBLICATIONS

Zhou et al., "Electron transfer coloration of fluorine leuco dyes with iodonium salt- an approach for color stabilization", Dyes and Pigments vol. 36(4) pp. 295-303 (1998).*

(Continued)

*Primary Examiner*—Martin J Angebranndt
(74) *Attorney, Agent, or Firm*—Andrew J. Caruso

(57) ABSTRACT

The present invention provides a method for storing holographic data comprising providing an optically transparent substrate comprising a photochemically active dye and a photo-acid generator; irradiating the optically transparent substrate with a holographic interference pattern, wherein the pattern has a first wavelength and an intensity both sufficient to convert, within a volume element of the substrate, at least some of the photochemically active dye into a photo-product, producing within the irradiated volume element concentration variations of the photo-product corresponding to the holographic interference pattern, thereby producing a first optically readable datum corresponding to the volume element; and irradiating the optically transparent substrate at a second wavelength and intensity sufficient to activate the photo-acid generator to stabilize the optically readable datum.

26 Claims, 4 Drawing Sheets

U.S. PATENT DOCUMENTS

| | | | |
|---|---|---|---|
| 2006/0005918 A1* | 1/2006 | Azakami et al. | 156/230 |
| 2006/0073392 A1* | 4/2006 | Erben et al. | 430/1 |
| 2006/0078802 A1* | 4/2006 | Chan et al. | 430/1 |
| 2006/0078803 A1* | 4/2006 | Takizawa et al. | 430/1 |
| 2006/0083890 A1* | 4/2006 | Takizawa | 428/64.1 |
| 2006/0160025 A1* | 7/2006 | Lungu | 430/300 |
| 2006/0188790 A1* | 8/2006 | Takizawa | 430/1 |

FOREIGN PATENT DOCUMENTS

| | | |
|---|---|---|
| JP | 3213394 A | 9/1991 |
| WO | WO2005006166 A1 | 1/2005 |
| WO | WO2006039130 A1 | 4/2006 |

OTHER PUBLICATIONS

PCT International Search Report dated May 18, 2007.

Kenta Tanaka et al., "Photocontrol of the Refractive Index of Poly(methyl methacrylate) With a Nitrone Additive", Journal of Applied Polymer Science, vol. 93, pp. 2517-2520, 2004.

James V. Crivello, "The Discovery and Development of Onium Salt Cationic Photoinitiators", Journal of Polymer Science: Part A: Polymer Chemistry, vol. 37, pp. 4241-4254, 1999.

Janet S. Splitter et al., "Oxaziridines. I. The Irradiation Products of Several Nitrones", Journal of Organic Chemistry, vol. 30, pp. 3427-3436, 1965.

Masamitsu Shirai et al., "Photoacid and Photobase Generators: Chemistry and Applications to Polymeric Materials", Prog. Polym. Sci., vol. 21, pp. 1-45, 1996.

J. V. Crivello, "The Chemistry of Photoacid Generating Compounds", A.C.S. Polym. Mat. Sci. Eng., vol. 61, pp. 62-66, 1989.

Yusuf Yagci et al., "Externally Stimulated Initiator Systems for Cationic Polymerization", Prog. Polym. Sci., vol. 23, pp. 1485-1538, 1998.

Yasumasa Toba et al., "Cationic Photopolymerization of Epoxides by Direct and Sensitized Photolysis of Onium Tetrakis(pentafluorophenyl)borate Initiators", American Chemical Society, Macromolecules, vol. 32, pp. 3209-3215, 1999.

Zaza Gomurashvili et al., "Monomeric and Polymeric Phenothiazine Photosensitizers fro Photoinitiated Cationic Polymerization", American Chemical Society, Marcomolecules, vol. 35, pp. 2962-2969, 2002.

Yujing Hua et al., "Development of Polymeric Photosensitizers for Photoinitiated Cationic Polymerization", American Chemical Society, Macromolecules, vol. 34, pp. 2488-2494, 2001.

Hasrat Ali et al., "Metal Complexes as Photo- and Radiosensitizers", American Chemical Society, Chem. Rev., vol. 99, pp. 2379-2450, 1999.

Co-pending U.S. Appl. No. 10/954,779, filed Sep. 30, 2004, entitled "Holographic Storage Medium".

* cited by examiner

METHODS FOR STORING HOLOGRAPHIC DATA AND ARTICLES HAVING ENHANCED DATA STORAGE LIFETIME DERIVED THEREFROM

BACKGROUND

The present disclosure relates to methods for storing holographic data. Further, the present disclosure relates to holographic data storage media and articles having an enhanced data storage lifetime, which are derived from these methods.

Holographic storage is the storage of data in the form of holograms, which are images of three dimensional interference patterns created by the intersection of two beams of light, in a photosensitive medium. The superposition of a signal beam, which contains digitally encoded data, and a reference beam forms an interference pattern within the volume of the medium resulting in a chemical reaction that changes or modulates the refractive index of the medium. This modulation serves to record as the hologram both the intensity and phase information from the signal. The hologram can later be retrieved by exposing the storage medium to the reference beam alone, which interacts with the stored holographic data to generate a reconstructed signal beam proportional to the initial signal beam used to store the holographic image. Thus, in holographic data storage, data is stored throughout the volume of the medium via three dimensional interference patterns.

Each hologram may contain anywhere from one to $1\times10^6$ or more bits of data. One distinct advantage of holographic storage over surface-based storage formats, including CDs or DVDs, is that a large number of holograms may be stored in an overlapping manner in the same volume of the photosensitive medium using a multiplexing technique, such as by varying the signal and/or reference beam angle, wavelength, or medium position. However, a major impediment towards the realization of holographic storage as a viable technique has been the development of a reliable and economically feasible storage medium.

Early holographic storage media employed inorganic photo-refractive crystals, such as doped or un-doped lithium niobate ($LiNbO_3$), in which incident light creates refractive index changes. These refractive index changes are due to the photo-induced creation and subsequent trapping of electrons leading to an induced internal electric field that ultimately modifies the refractive index through a linear electro-optic effect. However, $LiNbO_3$ is expensive, exhibits relatively poor efficiency, fades over time, and requires thick crystals to observe any significant index changes.

Therefore, there is a need for improved holographic data storage methods and materials through which enhanced holographic data storage capacities can be achieved Further, there is also a need for methods to enhance the lifetime of the stored holographic data, such that for example, the data is not erased thermally, or when ambient light is incident on the data storage medium, or during read-out.

SUMMARY

Disclosed herein are methods for storing holographic data in a storage medium having an enhanced data storage lifetime, and articles made using these methods.

In one aspect, the present invention provides for storing holographic data, said method comprising:

step (A) providing an optically transparent substrate comprising a photochemically active dye and a photo-acid generator;

step (B) irradiating the optically transparent substrate with a holographic interference pattern, wherein the pattern has a first wavelength and an intensity both sufficient to convert, within a volume element of the substrate, at least some of the photochemically active dye into a photo-product, and producing within the irradiated volume element concentration variations of the photo-product corresponding to the holographic interference pattern, thereby producing an optically readable datum corresponding to the volume element; and step (C) irradiating the optically transparent substrate at a second wavelength and intensity sufficient to activate the photo-acid generator to stabilize the optically readable datum.

In another aspect, the present invention provides a method for storing holographic data, said method comprising:

step (A) providing an optically transparent substrate comprising a photochemically active nitrone, a photo-acid generator, and a photo-sensitizer;

step (B) irradiating the optically transparent substrate with a holographic interference pattern, wherein the pattern has a first wavelength and an intensity both sufficient to convert, within a volume element of the substrate, at least some of the photochemically active nitrone into a photo-product of the photochemically active nitrone, and producing within the irradiated volume element concentration variations of the photo-product corresponding to the holographic interference pattern, thereby producing a first optically readable datum corresponding to the volume element; and step (C) irradiating the modified optically transparent substrate at a second wavelength and intensity sufficient to activate the photo-acid generator to stabilize the optically readable datum.

In still yet another aspect, the present invention provides an optical writing/reading method, said method comprising:

step (A) irradiating with a holographic interference pattern an optically transparent substrate that comprises a photochemically active dye and a photo-acid generator, wherein the pattern has a first wavelength and an intensity both sufficient to convert, within a volume element of the substrate, at least some of the photochemically active dye into a photo-product, and producing within the irradiated volume element concentration variations of the photo-product corresponding to the holographic interference pattern, thereby producing a first optically readable datum corresponding to the volume element; wherein the holographic interference pattern is produced by simultaneously irradiating the optically transparent substrate with a signal beam corresponding to data and a reference beam that does not correspond to data;

step (B) irradiating the optically transparent substrate at a second wavelength and intensity sufficient to activate the photo-acid generator to stabilize the optically readable datum; and step (C) irradiating the optically transparent substrate with a read beam and reading the optically readable datum by detecting diffracted light.

In another aspect of the invention, a method for forming a holographic data storage article is provided, said method comprising forming a film of an optically transparent substrate comprising an optically transparent plastic material, at least one photochemically active dye, and at least one photo-acid generator.

In still yet another aspect, the present invention provides for a holographic data storage medium that can be used for storing data in the form of holograms. The data storage medium comprises at least one optically transparent plastic material, at least one photochemically active dye, at least one photo-acid generator, and optionally at least one photo-sensitizer.

In another embodiment, the present invention provides for a data storage medium having at least one optically readable datum stored therein. The data storage medium comprises at least one optically transparent plastic material, at least one photochemically active dye, at least one photo-acid, at least one photo-product derived from the photochemically active dye, at least one photo-stable product derived from the at least one photochemically active dye, the at least one photo-product, or combinations thereof; and optionally at least one photo-sensitizer; wherein the at least one optically readable datum is stored as a hologram patterned within least one volume element of the optically transparent substrate included within the data storage medium.

These and other features, aspects, and advantages of the present invention may be more understood more readily by reference to the following detailed description.

BRIEF DESCRIPTION OF FIGURES

These and other features, aspects, and advantages of the present invention will become better understood when the following detailed description is read with reference to the accompanying drawings in which like characters represent like parts throughout the drawings, wherein.

DETAILED DESCRIPTION

Figure 1:
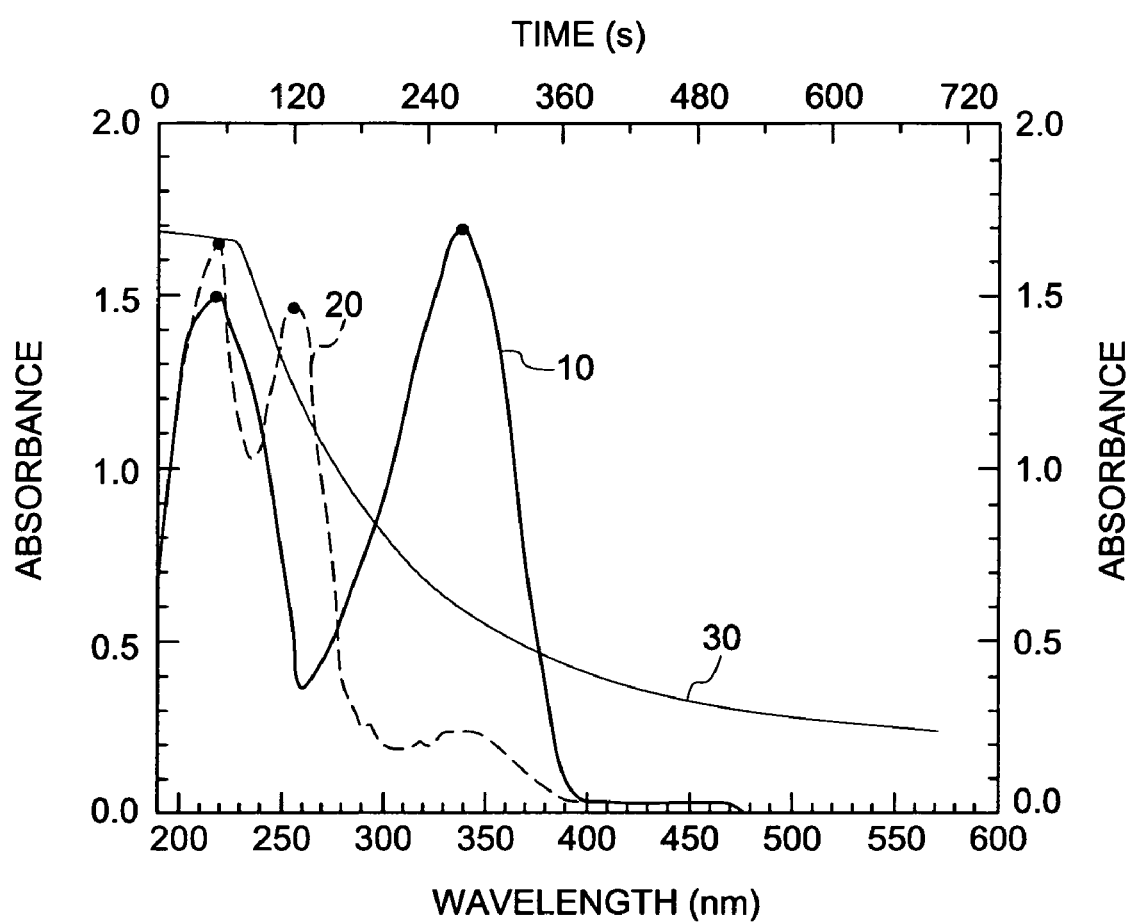
FIG. 1 shows a UV-visible absorption spectra for a PMMA film containing the dye α-styrenyl-N-isopropyl nitrone (SIPN), before and after being irradiated for about 5 minutes with light having a wavelength of 405 nanometers; and a monitor signal for the absorption maximum at 339 nanometers.

Some aspects of the present invention and general scientific principles used herein can be more clearly understood by referring to U.S. Patent Application 2005/0136333 (Ser. No. 10,742,461), which was published on Jun. 23, 2005; and co-pending Application having Ser. No. 10/954,779, filed on Sep. 30, 2004; both which are incorporated herein by reference in their entirety. It should be noted that with respect to the interpretation and meaning of terms in the present application, in the event of a conflict between this application and any document incorporated herein by reference, the conflict is to be resolved in favor of the definition or interpretation provided by the present application.

As used herein the term "aliphatic radical" refers to an organic radical having a valence of at least one consisting of a linear or branched array of atoms that is not cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a $C_6$ aliphatic radical comprising a methyl group, the methyl group being a functional group which is an alkyl group. Similarly, the 4-nitrobut-1-yl group is a $C_4$ aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., —$CH_2CHBrCH_2$—), and the like. Further examples of aliphatic radicals include allyl, aminocarbonyl (i.e., —$CONH_2$), carbonyl, 2,2-dicyanoisopropylidene (i.e., —$CH_2C(CN)_2CH_2$—), methyl (i.e., —$CH_3$), methylene (i.e., —$CH_2$—), ethyl, ethylene, formyl (i.e., —CHO), hexyl, hexamethylene, hydroxymethyl (i.e., —$CH_2OH$), mercaptomethyl (i.e., —$CH_2SH$), methylthio (i.e., —$SCH_3$), methylthiomethyl (i.e., —$CH_2SCH_3$), methoxy, methoxycarbonyl (i.e., $CH_3OCO$—), nitromethyl (i.e., —$CH_2NO_2$), thiocarbonyl, trimethylsilyl (i.e., $(CH_3)_3Si$—), t-butyldimethylsilyl, 3-trimethyoxysilypropyl (i.e., $(CH_3O)_3SiCH_2CH_2CH_2$—), vinyl, vinylidene, and the like. By way of further example, a $C_1$-$C_{10}$ aliphatic radical contains at least one but no more than 10 carbon atoms. A methyl group (i.e., $CH_3$—) is an example of a $C_1$ aliphatic radical. A decyl group (i.e., $CH_3(CH2)_9$—) is an example of a $C_{10}$ aliphatic radical.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical that comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —$(CH_2)_4$—. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl group, the methyl group being a functional group which is an alkyl group. Similarly, the 2-nitrophenyl group is a $C_6$ aromatic radical comprising a nitro group, the nitro group being a functional group. Aromatic radicals include halogenated aromatic radicals such as 4-trifluoromethylphenyl, hexafluoroisopropylidenebis(4-phen-1-yloxy) (i.e., —OPhC($CF_3$)$_2$PhO—), 4-chloromethylphen-1-yl, 3-trifluorovinyl-2-thienyl, 3-trichloromethylphen-1-yl (i.e., 3-$CCl_3$Ph-), 4-(3-bromoprop-1-yl)phen-1-yl (i.e., 4-BrCH$_2$CH$_2$CH$_2$Ph-), and the like. Further examples of aromatic radicals include 4-allyloxyphen-1-oxy, 4-aminophen-1-yl (i.e., 4-H$_2$NPh-), 3-aminocarbonylphen-1-yl (i.e., NH$_2$COPh-), 4-benzoylphen-1-yl, dicyanomethylidenebis(4-phen-1-yloxy) (i.e., —OPhC(CN)$_2$PhO—), 3-methylphen-1-yl, methylenebis(4-phen-1-yloxy) (i.e., —OPhCH$_2$PhO—), 2-ethylphen-1-yl, phenylethenyl, 3-formyl-2-thienyl, 2-hexyl-5-furanyl, hexamethylene-1,6-bis(4-phen-1-yloxy) (i.e., —OPh(CH$_2$)$_6$PhO—), 4-hydroxymethylphen-1-yl (i.e., 4-HOCH$_2$Ph-), 4-mercaptomethylphen-1-yl (i.e., 4-HSCH$_2$Ph-), 4-methylthiophen-1-yl (i.e., 4-CH$_3$SPh-), 3-methoxyphen-1-yl, 2-methoxycarbonylphen-1-yloxy (e.g., methyl salicyl), 2-nitromethylphen-1-yl (i.e., 2-NO$_2$CH$_2$Ph), 3-trimethylsilylphen-1-yl, 4-t-butyldimethylsilylphenl-1-yl, 4-vinylphen-1-yl, vinylidenebis (phenyl), and the like. The term "a $C_3$-$C_{10}$ aromatic radical" includes aromatic radicals containing at least three but no more than 10 carbon atoms. The aromatic radical 1-imidazolyl ($C_3H_2N_2$—) represents a $C_3$ aromatic radical. The benzyl radical ($C_7H_7$—) represents a $C_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group ($C_6H_{11}CH_2$—) is an cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylcyclopent-1-yl radical is a $C_6$ cycloaliphatic radical comprising a methyl group, the methyl group being a functional group which is an alkyl group. Similarly, the 2-nitrocyclobut-1-yl radical is a $C_4$ cycloaliphatic radical comprising a nitro group, the nitro group being a functional group. A cycloaliphatic radical may comprise one or more halogen atoms which may be the same or different. Halogen atoms include, for example; fluorine, chlorine, bromine, and iodine. Cycloaliphatic radicals comprising one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene-2,2-bis(cyclohex-4-yl) (i.e., —$C_6H_{10}$C(CF$_3$)$_2$$C_6H_{10}$—), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl, 2-bromopropylcyclohex-1-yloxy (e.g., CH$_3$CHBrCH$_2$C$_6$H$_{10}$O—), and the like. Further examples of cycloaliphatic radicals include 4-allyloxycyclohex-1-yl, 4-aminocyclohex-1-yl (i.e., H$_2$C$_6$H$_{10}$—), 4-aminocarbonylcyclopent-1-yl (i.e., NH$_2$COC$_5$H$_8$—), 4-acetyloxycyclohex-1-yl, 2,2-dicyanoisopropylidenebis(cyclohex-4-yloxy) (i.e., —OC$_6$H$_{10}$C(CN)$_2$C$_6$H$_{10}$O—), 3-methylcyclohex-1-yl, methylenebis(cyclohex-4-yloxy) (i.e., —OC$_6$H$_{10}$CH$_2$C$_6$H$_{10}$O—), 1-ethylcyclobut-1-yl, cyclopropylethenyl, 3-formyl-2-terahydrofuranyl, 2-hexyl-5-tetrahydrofuranyl, hexamethylene-1,6-bis(cyclohex-4-yloxy) (i.e., —OC$_6$H$_{10}$(CH$_2$)$_6$C$_6$H$_{10}$O—), 4-hydroxymethylcyclohex-1-yl (i.e., 4-HOCH$_2$C$_6$H$_{10}$—), 4-mercaptomethylcyclohex-1-yl (i.e., 4-HSCH$_2$C$_6$H$_{10}$—), 4-methylthiocyclohex-1-yl (i.e., 4-CH$_3$SC$_6$H$_{10}$—), 4-methoxycyclohex-1-yl, 2-methoxycarbonylcyclohex-1--yloxy (2-CH$_3$OCOC$_6$H$_{10}$O—), 4-nitromethylcyclohex-1-yl (i.e., NO$_2$CH$_2$C$_6$H$_{10}$—), 3-trimethylsilylcyclohex-1-yl, 2-t-butyldimethylsilylcyclopent-1-yl, 4-trimethoxysilylethylcyclohex-1-yl (e.g., (CH$_3$O)$_3$SiCH$_2$CH$_2$C$_6$H$_{10}$—), 4-vinylcyclohexen-1-yl, vinylidenebis(cyclohexyl), and the like. The term "a $C_3$-$C_{10}$ cycloaliphatic radical" includes cycloaliphatic radicals containing at least three but no more than 10 carbon atoms. The cycloaliphatic radical 2-tetrahydrofuranyl (C$_4$H$_7$O—) represents a C$_4$ cycloaliphatic radical. The cyclohexylmethyl radical (C$_6$H$_{11}$CH$_2$—) represents a C$_7$ cycloaliphatic radical.

As defined herein, the abbreviation "PAG" stands for "photo-acid generator", the abbreviation "SIPN" stands for α-styrenyl isopropyl nitrone, and the abbreviation "nm" stands for the term "nanometer". Poly(methylmethacrylate) is herein abbreviated as "PMMA".

As used herein, the terms "photochemically reactive" and "photochemically active" have the same meaning and are interchangeable terms.

As defined herein, the term "photo-stable product" refers to a reaction product which shows greater photostability than a corresponding photochemically active chemical species from which it was derived. For example, protonation of a photochemically active nitrone dye affords as a reaction product, the corresponding protonated nitrone. The protonated nitrone is a "photo-stable product" because it shows greater photostability on average than does the unprotonated photochemically active nitrone dye from which it was derived. Similarly, an amide produced by the photo-induced cyclization of a photochemically active nitrone to an oxaziridine followed by acid catalyzed rearrangement of the oxaziridine to an amide is defined as a photo-stable product because it shows greater photostability on average than the photochemically active nitrone dye from which it was derived.

As defined herein, the term "optically transparent" as applied to an optically transparent substrate or an optically transparent plastic material means that the substrate or plastic material has an absorbance of less than 1. That is, at least 10 percent of incident light is transmitted through the material at least one wavelength in a range between about 300 and about 800 nanometers.

As defined herein, the term "volume element" means a three dimensional portion of a total volume.

As defined herein, the term "optically readable datum" can be understood as a datum that is stored as a hologram patterned within one or more volume elements of an optically transparent substrate.

As noted, the present invention provides a method for storing holographic data. The method comprises irradiating an optically transparent substrate comprising a photochemically active dye and a photo-acid generator with a holographic interference pattern. The holographic interference pattern has a first wavelength and an intensity that are sufficient to convert, within a volume element of the substrate being irradiated, at least some of the photochemically active dye into a photo-product, and producing within the irradiated volume element concentration variations of the photo-product corresponding to the holographic interference pattern. An optically readable datum corresponding to the volume element is produced thereby. After the optically readable datum has been written into the optically transparent substrate, the optically transparent substrate is irradiated at a second wavelength and intensity sufficient to activate the photo-acid generator to stabilize the optically readable datum.

The refractive index within an individual volume element may be constant throughout the volume element, as in the case of a volume element that has not been exposed to electromagnetic radiation, or in the case of a volume element in which the photochemically active dye has been reacted to the same degree throughout the volume element. It is believed that most volume elements that have been exposed to electromagnetic radiation during the holographic data writing process will contain a complex holographic pattern, and as such, the refractive index within the volume element will vary across the volume element. In instances in which the refractive index within the volume element varies across the volume element, it is convenient to regard the volume element as having an "average refractive index" which may be compared to the refractive index of the corresponding volume element prior to irradiation. Thus, in one embodiment an optically readable datum comprises at least one volume element having a refractive index that is different from a (the) corresponding volume element of the optically transparent substrate prior to irradiation. Data storage is achieved by locally changing the refractive index of the data storage medium in a graded fashion (continuous sinusoidal variations), rather than discrete steps, and then using the induced changes as diffractive optical elements.

Figure 2:
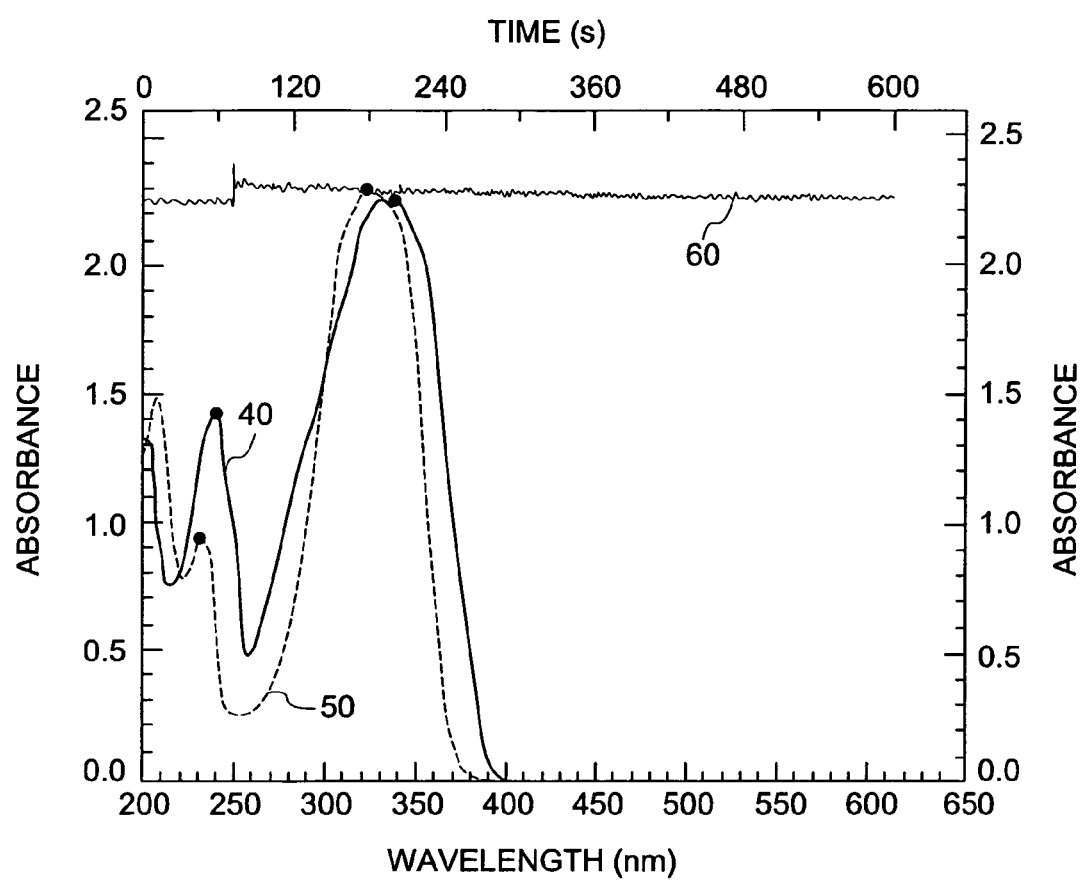
FIG. 2 is a set of UV-visible absorption spectra for an acetonitrile solution containing the dye of FIG. 1 and hydrochloric acid before and after being irradiated with light having a wavelength of 390 nanometers for about 9 minutes; and a monitor signal for the absorption maximum at 339 nanometers.

The various spectra shown in FIGS. 1-4 are explained in greater detail below and illustrate various aspects of the invention. Briefly here, in FIG. 1, 10 and 20 are UV-visible absorption spectra for a PMMA film containing SIPN (α-styrenyl-N-isopropyl nitrone), before and after being irradiated for about 5 minutes with light having a wavelength of 405 nanometers, respectively; and 30 is monitor signal 1 for the absorption maximum at 339 nanometers. In FIGS. 2, 40 and 50 are UV-visible absorption spectra for an acetonitrile solution containing SIPN and hydrochloric acid before and after being irradiated with light having a wavelength of 390 nanometers for about 9 minutes, respectively; and 60 is the monitor signal 2 for the absorption maximum at 339 nanometers.

As defined herein, the term M/# denotes the capacity of a data storage medium, and can be measured as a function of the total number of multiplexed holograms that can be recorded at a volume element of the data storage medium at a given diffraction efficiency. M/# depends upon various parameters, such as the change in refractive index (Δn), the thickness of the medium, and the dye concentration. These terms are described further in this disclosure. The M/# is defined as shown in equation (1):

$$M/\# = \sum_{i=1}^{N} \sqrt{\eta_i} \qquad \text{Equation (1)}$$

where $\eta_i$ is diffraction efficiency of the $i^{th}$ hologram, and N is the number of recorded holograms. The experimental setup for M/# measurement for a test sample at a chosen wavelength, for example, at 532 nanometers or 405 nanometers, involves positioning the testing sample on a rotary stage that is controlled by a computer. The rotary stage has a high angular resolution, for example, about 0.0001 degree. An M/# measurement involves two steps: recording and readout. At recording, multiple planewave holograms are recorded at the same location on the same sample. A plane wave hologram is a recorded interference pattern produced by a signal beam and a reference beam. The signal and reference beams are coherent to each other. They are both planewaves that have the same power and beam size, incident at the same location on the sample, and polarized in the same direction. Multiple planewave holograms are recorded by rotating the sample. Angular spacing between two adjacent holograms is about 0.2 degree. This spacing is chosen so that their impact to the previously recorded holograms, when multiplexing additional holograms, is minimal and at the same time, the usage of the total capacity of the media is efficient. Recording time for each hologram is generally the same in M/# measurements. At readout, the signal beam is blocked. The diffracted signal is measured using the reference beam and an amplified photo-detector. Diffracted power is measured by rotating the sample across the recording angle range with a step size of about 0.004 degree. The power of the reference beam used for readout is typically about 2-3 orders of magnitude smaller than that used at recording. This is to minimize hologram erasure during readout while maintaining a measurable diffracted signal. From the diffracted signal, the multiplexed holograms can be identified from the diffraction peaks at the hologram recording angles. The diffraction efficiency of the $i^{th}$ hologram, $\eta_i$, is then calculated by using equation (2):

$$\eta_i = \frac{P_{i,diffracted}}{P_{reference}} \qquad \text{Equation (2)}$$

where $P_{i, diffracted}$ is the diffracted power of the $i^{th}$ hologram. M/# is then calculated using the diffraction efficiencies of the holograms and equation (1). Thus, a holographic plane wave characterization system may be used to test the characteristics of the data storage material, especially multiplexed holograms. Further, the characteristics of the data storage material can also be determined by measuring the diffraction efficiency.

The capacity to store data as holograms (M/#) is also directly proportional to the ratio of the change in refractive index per unit dye density (Δn/N0) at the wavelength used for reading the data to the absorption cross section (σ) at a given wavelength used for writing the data as a hologram. The refractive index change per unit dye density is given by the ratio of the difference in refractive index of the volume element before irradiation minus the refractive index of the same volume element after irradiation to the density of the dye molecules. The refractive index change per unit dye density has a unit of (centimeter)³. Thus in an embodiment, the optically readable datum comprises at least one volume element wherein the ratio of the change in the refractive index per unit dye density of the at least one volume element to an absorption cross section of the at least one photochemically active dye is at least about $10^{-5}$ expressed in units of centimeter.

Sensitivity (S) is a measure of the diffraction efficiency of a hologram recorded using a certain amount of light fluence (F). The light fluence (F) is given by the product of light intensity (I) and recording time (t). Mathematically, sensitivity is given by equation (3), $$S = \frac{\sqrt{\eta}}{I \cdot t \cdot L} \text{ (cm/J)} \qquad \text{Equation (3)}$$

wherein I is the intensity of the recording beam, "t" is the recording time, L is the thickness of the recording (or data storage) medium (example, disc), and η is the diffraction efficiency. Diffraction efficiency is given by equation (4), $$\eta = \sin^2\left(\frac{\pi \cdot \Delta n \cdot L}{\lambda \cdot \cos(\theta)}\right) \qquad \text{Equation (4)}$$

wherein λ is the wavelength of light in the recording medium, θ is the recording angle in the media, and Δn is the refractive index contrast of the grating, which is produced by the recording process, wherein the dye molecule undergoes a photochemical conversion.

The absorption cross section is a measurement of an atom or molecule's ability to absorb light at a specified wavelength, and is measured in square cm/molecule. It is generally denoted by σ(λ) and is governed by the Beer-Lambert Law for optically thin samples as shown in Equation (5), $$\sigma(\lambda) = \ln(10) \cdot \frac{\text{Absorbance}(\lambda)}{N_0 \cdot L} \text{ (cm}^2\text{)} \qquad \text{Equation (5)}$$

wherein $N_0$ is the concentration in molecules per cubic centimeter, and L is the sample thickness in centimeters.

Quantum efficiency (QE) is a measure of the probability of a photochemical transition for each absorbed photon of a given wavelength. Thus, it gives a measure of the efficiency with which incident light is used to achieve a given photochemical conversion, also called as a bleaching process. QE is given by equation (6), $$QE = \frac{hc/\lambda}{\sigma \cdot F_0} \qquad \text{Equation (6)}$$

wherein "h" is the Planck's constant, "c" is the velocity of light, σ(λ) is the absorption cross section at the wavelength λ, and $F_0$ is the bleaching fluence. The parameter $F_0$ is given by the product of light intensity (I) and a time constant (τ) that characterizes the bleaching process.

The photochemically active dye is one which renders the optically transparent substrate capable of having holograms "written" into it at a first wavelength. And further, the photochemically active dye should be such that a hologram having been "written" into the optically transparent substrate at a first wavelength is not erased when the hologram is "read". It is desirable to use dyes that enable "writing" of the holographic interference pattern into the optically transparent substrate at wavelengths in a range from about 300 nm to about 1,500 nm.

In one embodiment, the photochemically active dye has an optical absorption resonance characterized by a center wavelength associated with the maximum absorption and a spectral width (full width at half of the maximum, FWHM) of less than 500 nanometers. Typically, the photochemically active dyes undergo a light induced chemical reaction when exposed to light with a wavelength within the absorption range to form at least one photo-product. This reaction can be a photodecomposition reaction, such as oxidation, reduction, or bond breaking to form smaller constituents, or a molecular rearrangement, such as a sigmatropic rearrangement, or addition reactions including pericyclic cycloadditions. Thus in an embodiment, data storage in the form of holograms is achieved wherein the photo-product is patterned (for example, in a graded fashion) within the modified optically transparent substrate to provide the at least one optically readable datum.

In an embodiment, the photochemically active dye is a vicinal diarylethene. In another embodiment, the photochemically active dye is a photo-product resulting from a photochemically active dye, such as for example, a product resulting from photochemical cyclization of a diarylethene that is capable of cyclizing; or a product resulting from ring opening of a vicinal diarylethene that is capable of ring opening. In still another embodiment, the photochemically active dye is a nitrostilbene. In still yet another embodiment, the photochemically active dye is a nitrone. In one embodiment, a combination comprising two or more photochemically active dyes selected from the group consisting of a vicinal diarylethene, a nitrone, a photo-product derived from a vicinal diarylethene, and a nitrostilbene is used.

Photochemically active nitrones are particularly useful compounds for producing holographic data storage articles. In an embodiment, the photochemically active nitrone has desirable optical properties, such as a relatively low absorption cross-section while having a relatively high refractive index change and/or relatively high quantum efficiency for the photo-induced reaction. High quantum efficiency also leads to a higher sensitivity since sensitivity is directly proportional to the product of quantum efficiency and refractive index change (defined as Δn). Writing of data as a hologram into the optically transparent substrate comprising the photochemical active dye is due to the dye undergoing a partial photochemical conversion at the write wavelength, thereby producing a modified optically transparent substrate comprising at least one optically readable datum. The "write wavelength" corresponds to the wavelength of the holographic interference pattern which is used to irradiate the optically transparent substrate. The sensitivity of a dye-doped data storage material (here, an optically transparent substrate comprising a photochemically reactive dye) is dependent upon the concentration of the dye ($N_0$), the dye's absorption cross-section at the recording wavelength, the quantum efficiency QE of the photochemical transition, and the index change of the dye molecule for a unit dye density ($\Delta n_0/N_0$). However, as the product of dye concentration and the absorption cross-section increases, the dye-doped storage material tends to become opaque, which inhibits both recording and readout. Therefore, in an embodiment, photochemically active nitrones of interest for achieving high M/#s are those materials that undergo an efficient photochemical transformation accompanied with a high refractive index change and a high quantum efficiency at the wavelength that is used for writing data, one that is removed from the main UV-visible absorption peak of the dye. One such example of a suitable photochemically active nitrone dye is SIPN (α-styrenyl isopropyl nitrone), which rearranges to an oxaziridine with high quantum efficiency (QE greater than 0.1), upon irradiation with light having a wavelength of 405 nm.

In one embodiment, the photochemically active nitrones suitable for use according to the present invention are illustrated by nitrones having structure (I),

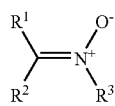
(I)

wherein $R^1$ is an aliphatic radical, a cycloaliphatic radical, or an aromatic radical that is capable of conjugating with the nitrone group; $R^2$ is hydrogen or an aliphatic radical, a cycloaliphatic radical, or an aromatic radical that is capable of conjugating with the nitrone group; and $R^3$ is an aliphatic radical, a cycloaliphatic radical, or an aromatic radical. The expression "capable of conjugating with the nitrone group" means that the "R-group" (here $R^1$ or $R^2$) comprises at least one double bond which is conjugated with the double bond of the nitrone moiety.

In an embodiment, $R^1$ has a structure (II),

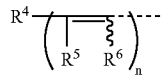
(II)

wherein each of $R^4$, $R^5$, and $R^6$, is a hydrogen atom, an aliphatic radical, a cycloaliphatic radical, or an aromatic radical; and "n" is an integer having a value of from 1 to 4.

In another embodiment, useful photochemically active nitrones are aromatic nitrones represented by the structure (III),

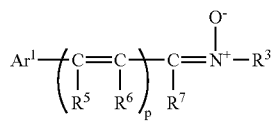
(III)

wherein $Ar^1$ ($Ar^1$ corresponds to $R^4$ structure II) is an aromatic radical; each of $R^5$, $R^6$, and $R^7$ is a hydrogen atom, an aliphatic radical, a cycloaliphatic radical, or an aromatic radical; $R^3$ is an aliphatic radical, cycloaliphatic radical, or an aromatic radical, and "p" is an integer having a value of from 0 to 4. In one embodiment, $R^3$ is an aromatic radical comprising one or more electron withdrawing substituents selected from the group consisting of

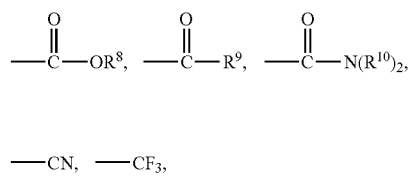

and $NO_2$;

wherein $R^8$-$R^{10}$ are independently an aliphatic radical, a cycloaliphatic radical or an aromatic radical.

In an embodiment, the photochemically active nitrone is a cyclic nitrone wherein the nitrone moiety is part of a heterocyclic ring, for example where $R^2$ and $R^3$ in structure (I) are linked together to form part of a ring. An example of such a compound is shown in structure (IV),

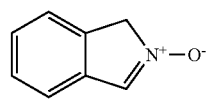
(IV)

which can in principle be formed from 2-(hydroxylaminomethyl)benzaldehyde.

Some more specific examples of photochemically active nitrones which fall within the scope of compounds having general structure (I), and those compounds that further have the features of structure (II) are shown in Table 1 below, which include the α-styrenyl alkyl nitrones and α-styrenyl aryl nitrones. In one embodiment, the photochemically reactive dye is a nitrone incorporating structure (II) wherein $R^4$ is not an aromatic group, and wherein "n" is 2 or higher (See Example II-B in Table 1).

TABLE 1

| Example | $R^1$ | $R^2$ | $R^3$ | $R^4$ | $R^5$ | $R^6$ | n |
|---------|-------|-------|-------|-------|-------|-------|---|
| I-A | phenyl | cyclohexyl | isopropyl | — | — | — | — |
| I-B | 4-hydroxyphenyl | H | ethyl | — | — | — | — |
| I-C | 4-methoxyphenyl | methyl | cyclohexyl | — | — | — | — |
| I-D | 4-methoxyphenyl | H | 4-nitrophenyl | — | — | — | — |
| II-A | — | H | isopropyl | phenyl | H | H | 1 |
| II-B | — | H | cyclohexyl | (4-dimethylamino)-phenyl | H | H | 2 |
| II-C | — | H | 4-nitrophenyl | (4-dimethylamino)-phenyl | H | H | 1 |

Structure (III), illustrates α-aromatic-N-aromatic nitrones or conjugated analogs thereof in which the conjugation is between the aromatic group and an α-carbon atom suitable for use as the photochemically reactive dye. In certain embodiments, the α-aromatic group is substituted by a dialkylamino group, in which the alkyl groups contain 1 to about 4 carbon atoms. Suitable, non-limiting examples of nitrones include α-styrenyl isopropyl nitrone (SIPN), α-(4-diethylaminophenyl)-N-phenylnitrone; α-(4-diethylaminophenyl)-N-(4-chlorophenyl)-nitrone, α-(4-diethylaminophenyl)-N-(3,4-dichlorophenyl)-nitrone, α-(4-diethylaminophenyl)-N-(4-carbethoxyphenyl)-nitrone, α-(4-diethylaminophenyl)-N-(4-acetylphenyl)-nitrone, α-(4-dimethylaminophenyl)-N-(4-cyanophenyl)-nitrone, α-(4-methoxyphenyl)-N-(4-cyanophenyl)nitrone, α-(9-julolidinyl)-N-phenylnitrone, α-(9-julolidinyl)-N-(4-chlorophenyl)nitrone, α-(4-dimethylamino)styrenyl-N-phenyl nitrone, α-styrenyl-N-phenyl nitrone, α-[2-(1,1-diphenylethenyl)]-N-phenylnitrone, α-[2-(1-phenylpropenyl)]-N-phenylnitrone, or a combination comprising at least one of the foregoing nitrones.

In one embodiment, upon exposure to the holographic interference pattern having a first wavelength and intensity sufficient to record at least one optically readable datum, the photochemically active nitrone dispersed in an optically transparent substrate undergoes a unimolecular cyclization to an oxaziridine. The oxaziridine resulting from irradiation of an aromatic nitrone having the structure (III) is shown in structure (V),

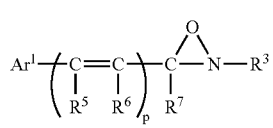

(V)

wherein $Ar^1$, $R^3$, $R^5$-$R^7$, and "p" have the same meaning as denoted above for structure (III). The photocyclization of the aromatic nitrone to the oxaziridine proceeds with a high quantum efficiency, and frequently a large refractive index change. Typically, the photocyclization is induced in only a portion of the total amount of the photochemically active nitrone present in a given volume element thus providing a refractive index contrast between the unconverted dye and the oxaziridine photo-product, and providing the concentration variations of the photo-product corresponding to the holographic interference pattern, and constituting the optically readable datum.

As noted, the optically readable datum is stabilized by irradiating the optically transparent substrate at a second wavelength and intensity sufficient to activate the photo-acid generator (PAG). Suitable PAGs include ionic PAGs and non-ionic PAGs. Further, the PAG can be a polymeric compound or a non-polymeric compound. In an embodiment, onium salts can be used as PAGs. Non-limiting examples of onium salts include iodonium salts, sulfonium salts, selenonium salts, phosphonium salts, N-alkoxypyridinium salts, and ferrocenium salts. In an embodiment, the onium salt comprises at least one member selected from the group consisting of onium salts having a formula (VI):

 (VI)

wherein "$A^+$" is independently diaryliodonium, diarylchloronium, diarylbromonium, triarylsulfonium, triarylselenonium, ferrocenium, or tetraarylphosphonium; and "$L^-$" is independently hexafluorophosphate, trifluoromethanesulfonate, hexafluorophosphate, tetrafluoroborate, hexafluoroarsenate, or hexafluoroantimonate. Diphenyliodonium trifluoromethanesulfonate is an exemplary PAG. Suitable classes of compounds that can function as non-ionic PAGs include nitrobenzyl esters, sulfone compounds, organic phosphates, halogen compounds, and iminosulfonates. The term "sulfone compound" is herein meant to encompass a variety of photochemically active compounds, such as for example, photochemically active sulfones, sulfonyloxy compounds, aryl sulfonates, and N-hydroxyimide sulfonates. A variety of PAGs, as disclosed by Shriai et al. in "Photo-acid And Photobase Generators: Chemistry And Applications To Polymeric Materials", Prog. Polym. Sci., Vol. 21, pp. 1-45; and by Yagci et al. in "Externally Stimulated Initiator Systems For Cationic Polymerization", Prog. Polym. Sci., Vol. 23, pp. 1485-1538, can be used in various embodiments of the present invention.

In one embodiment, a photo-sensitizer is present in the optically transparent substrate. Suitable photo-sensitizers include polymeric photo-sensitizers, non-polymeric photo-sensitizers, and mixtures of thereof. Suitable polymeric photo-sensitizers include polymeric phenothazines, such as those disclosed by Zaza Gomurashvili and James V. Crivello in "Monomeric And Polymeric Phenothiazine Photo-sensitizers For Photoinitiated Cationic Polymerization", Macromolecules, Vol. 35, pp. 2962-2969. Other examples of a polymeric photo-sensitizer include homopolymers and copolymers of N-vinylcarbazole, as disclosed by Yujing Hua and James V. Crivello in "Development Of Polymeric Photo-sensitizers For Photoinitiated Cationic Polymerization", Macromolecules, 2001, 34, 2488-2494. Examples of non-polymeric photo-sensitizers include phenothiazine compounds, anthracene compounds, naphthacene compounds, porphyrin compounds and related compounds, which include the chlorins, benzochlorins, porphycenes, expanded porphyrins, and the like; phthalocyanine compounds, naphtalocyanine compounds, chalcogenapyrilium nitrone compounds, merocyanine nitrone compounds, quasiaromatic heterocyclic compounds, Nile Blue nitrone compounds, and metal-bipyridine complexes. Some specific examples of non-polymeric phenothiazine compounds include phenothiazine, 10-(2,3-epoxypropyl)phenothiazine, 10-allylphenothiazine, 10-(1-propenyl)phenothiazine, 10-(2-vinyloxyethyl)phenothiazine, 10-(2-vinyloxyethyl)phenothiazine-5,5-dioxide, 10-phenothiazine-5-oxide, and 10H-phenothiazine-5,5-dioxide. Further examples of non-polymeric photo-sensitizers include those disclosed by Zaza Gomurashvili and James V. Crivello in "Monomeric And Polymeric Phenothiazine Photo-sensitizers For Photoinitiated Cationic Polymerization", Macromolecules, Vol. 35, pp. 2962-2969; and ruthenium complexes comprising bipyridine, such as tris(2,2'-bipyridyl)ruthenium (II) chloride. 1,12-bis(phenylethynyl) naphthacene is an exemplary photo-sensitizer.

In one embodiment, as noted above, step (B) in the method for storing holographic data, comprises irradiating the optically transparent substrate with a holographic interference pattern, wherein the pattern has a first wavelength and an intensity both sufficient to convert, within a volume element of the substrate, at least some of the photochemically active dye into a photo-product, and producing within the irradiated volume element concentration variations of the photo-product corresponding to the holographic interference pattern, thereby producing an optically readable datum corresponding to the volume element. The optically readable datum is stored in the optically transparent substrate as a hologram patterned within at least one volume element of the optically transparent substrate. In one embodiment, the photochemical conversion of a nitrone dye to photo-product(s) can occur within the context of a photo-decomposition reaction, such as oxidation, reduction, or a bond breaking process to form smaller constituents; or a molecular rearrangement, such as a photocyclization, sigmatropic rearrangement; or addition reaction, including pericyclic cycloadditions. In an embodiment, the photo-product is an aromatic oxaziridine derived from rearrangement (here photocyclization) of an aromatic nitrone. Generally, when step (B) is carried out, the PAG is unaffected by the radiation having the first wavelength (the holographic interference pattern). In step (C), the optically transparent substrate is irradiated at a second wavelength to produce a photo-stable product, thereby stabilizing the at least one optically readable datum formed in step (B). The second wavelength is chosen so as to facilitate the release of the photo-acid from the PAG. When a photo-sensitizer is used, the energy required to release the photo-acid from the PAG can be lowered (i.e., the photo-acid release can occur at a longer wavelength). It is possible, in some instances, to release the photo-acid from a PAG without the assistance of a photo-sensitizer by using radiation having a relatively higher energy, such as for example radiation in the ultraviolet or the near ultraviolet range.

The photo-acid has more than one useful function. First, in certain embodiments, the photo acid promotes the rearrangement of a relatively labile oxaziridine photo-product to one or more amide photo-stable products which are photo-stable under the conditions used for reading the holographic data. For example, an aromatic oxaziridine having the structure (V), may rearrange under the influence of the photo-acid to one or both of the isomeric amides (VII) and (VIII)

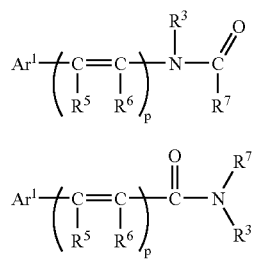

wherein $Ar^1$, $R^3$, $R^5$-$R^7$, and "p" are as previously described for structure (III). In an embodiment, when $R^7$ is a hydrogen atom, formamides having the general structure (IX),

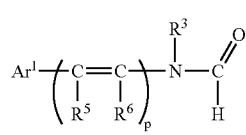

wherein $Ar^1$, $R^3$, $R^5$, $R^6$, and "p" are as previously described for structure (III), can be formed. Formation of the amide form is advantageous as it prevents the oxaziridine from reverting to the starting nitrone under the influence of an external stimulus, such as ambient heat or light. In certain instances, in the absence of the photo-acid, the oxaziridine may tend to revert to the nitrone form, a circumstance which can lead to erasure of some or all of the stored data.

A second useful function of the photo-acid is that it acts to protonate unconverted nitrone (remaining after the initial formation of the oxaziridine) thereby inhibiting the photocyclization of the nitrone to the oxaziridine under the influence of an external stimulus, such as ambient light or a read beam. Those skilled in the art will appreciate that the lingering photosensitivity of the unconverted photochemically reactive dye can adversely affect the integrity of the stored data if no step is take to stabilize the unconverted photochemically reactive dye. In the case where the unconverted photochemically reactive dye is a nitrone, protonation of the nitrone remaining following the recording of the holographic data provides an efficient means of preventing further conversion of the nitrone to photo-products under the influence of, for example, a read beam or ambient light. Exposure of a nitrone of formula (III) to a source of protons is thought to lead to formation of protonated nitrones having idealized formula (X):

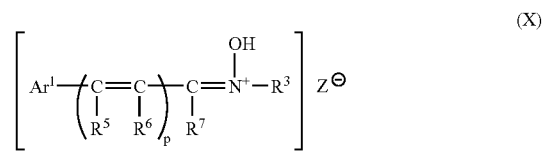

wherein "$Z^-$" is the anion resulting from protonation of the nitrone by a photo-acid having a formula H-Z; and $Ar^1$, $R^3$, $R^5$-$R^7$, and "p" are as defined for structure (III). Those skilled in the art will appreciate that less than a stoichiometric amount of photo-acid may be effective in stabilizing the nitrone, owing to the very high mobility of protons generally, and the ability of protons to form two bonds via hydrogen bonding.

In one aspect of the present invention, protonated nitrones having idealized formula (X) are examples of photo-stable products formed when the optically transparent substrate is irradiated at a second wavelength and intensity sufficient to activate the photo-acid generator to stabilize the optically readable datum. The UV-visible absorption spectra of the protonated nitrones resulting from the protonation are similar to those of the nitrones. Hence, in an embodiment, the refractive index contrast provided by the difference in refractive indices between a protonated nitrone and the corresponding oxaziridine can also be used to store the data as a hologram patterned within at least one volume element of the optically transparent substrate. It is believed that almost any acid can be used to convert the photochemically reactive nitrone into a photo-stable product protonated nitrone and thereby stabilize the at least one optically readable datum. The acid can be an inorganic acid, such as for example, hydrochloric acid, sulfuric acid, nitric acid, phosphoric acid, hexafluorophosphoric acid, tetrafluoroboric acid, hexafluoroantimonic acid, and the like; or an organic acid, such as for example, trifluoromethanesulfonic acid, perfluorobutanesulfonic acid, methanesulfonic acid, and the like. Combinations of an organic acid and an inorganic acid can also be used.

These concepts are illustrated more clearly with SIPN (α-styrenyl-N-isopropyl nitrone) taken as an example of a photochemically reactive dye. Referring to FIG. 1, the UV-visible absorption spectrum 10 for a spin cast film of PMMA containing SIPN shows an absorption maximum at about 340 nm. Then the sample is irradiated with light having a wavelength of 405 nm for about 5 minutes and the spectrum is measured. The UV-visible absorption spectrum 20 shows a much reduced absorption at about 340 nm for SIPN and a new absorption maximum at about 254 nm, which is indicative of the partial formation of oxaziridine (XI),

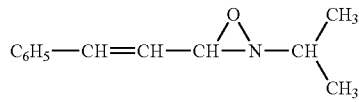
(XI)

with 30 being the monitor signal for the absorption at 339 nm. Control experiments were carried out to show that SIPN remaining after the partial photochemical conversion to oxaziridine (XI) can be stabilized by converting the SIPN to a protonated form. FIG. 2 shows the UV-visible absorption spectrum 40 for an acetonitrile solution of SIPN containing hydrochloric acid. Comparison of spectrum 40 with spectrum 10 of FIG. 1 shows that the absorption spectra for the unprotonated SIPN and protonated SIPN are essentially the same. Next the acetonitrile solution was irradiated with light having a wavelength of 390 nm for about 9 minutes. The absorption spectrum 50 shows no new peaks indicative of formation of an oxaziridine, thus indicating that protonated SIPN does not rearrange. The data show that the unconverted SIPN in the PMMA film can be stabilized (or "fixed") as the protonated form after partial photochemical conversion of SIPN to the oxaziridine (XI), that is, SIPN is prevented from converting to the oxaziridine (XI) under the influence of an external stimulus, such as ambient light, thereby helping to maintain the integrity of the stored data in the holographic data storage medium. Further, the relatively labile oxaziridine (XI) may rearrange to a photo-stable product amide in the presence of an acid, as previously mentioned.

Figure 3:
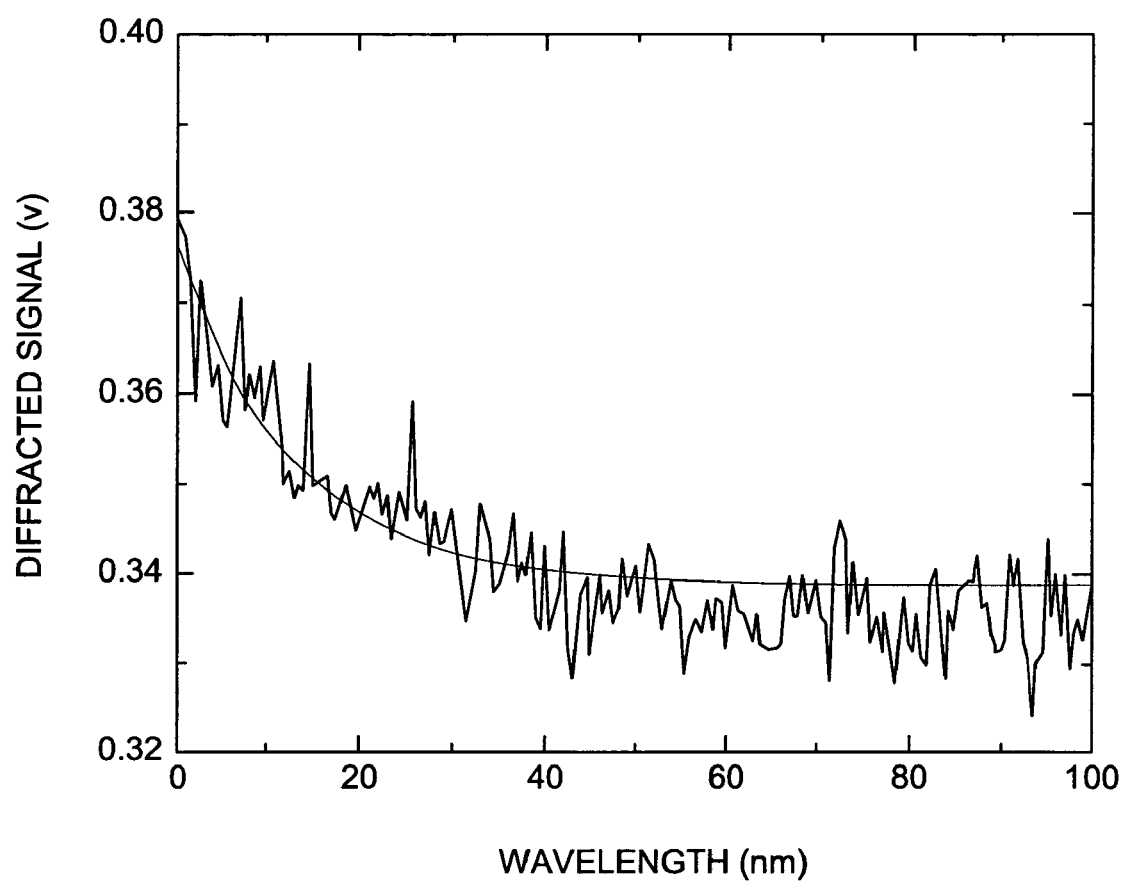
FIG. 3 shows the diffracted signal from a plane-wave hologram written with light having a wavelength of 405 nanometers, into a PMMA film containing SIPN, diphenyliodonium triflate photo-acid generator, and 5,12-bis(phenylethynyl) naphthacene sensitizer, while it is being read out with a read beam having a wavelength of 405 nanometers.
Figure 4:
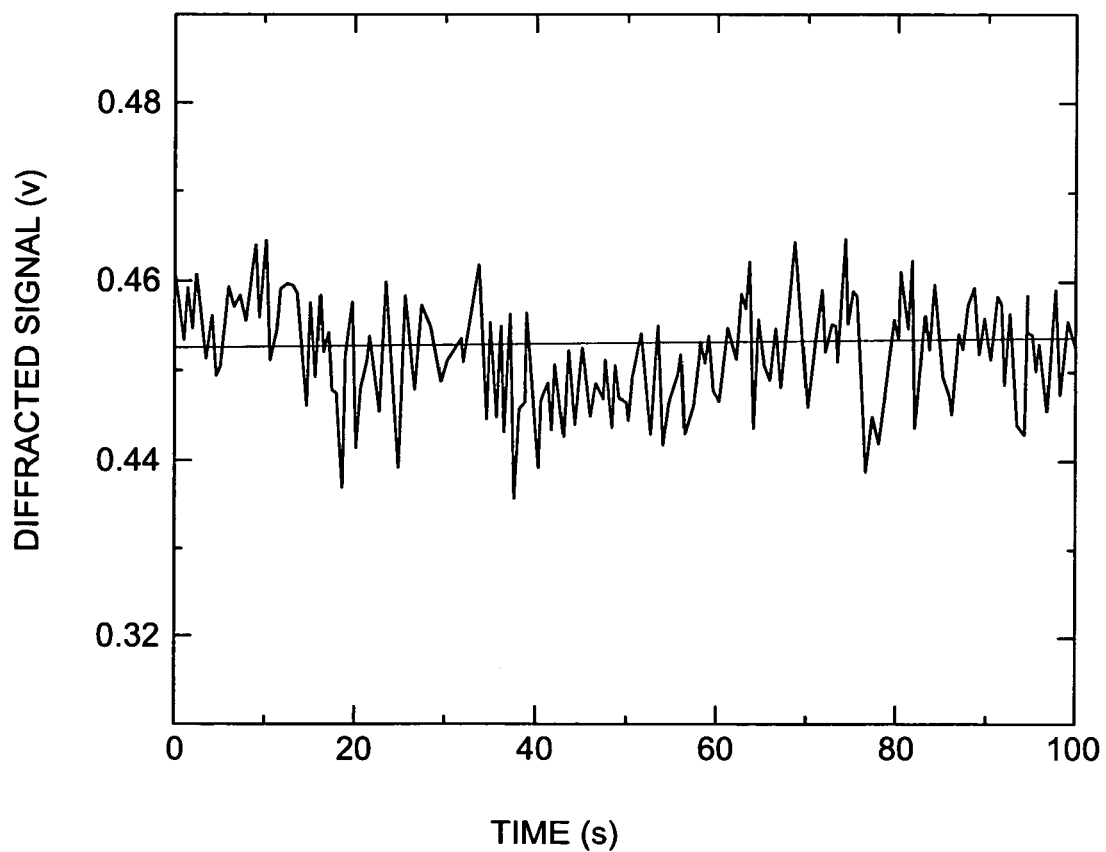
FIG. 4 shows the diffracted signal from a plane-wave hologram written with light having a wavelength of 405 nanometers into a PMMA film containing SIPN, diphenyliodonium triflate photo-acid generator, and 5,12-bis(phenylethynyl) naphthacene sensitizer, after being further exposed to light having a wavelength of 532 nm for about 2 minutes, while it is being read out with a read beam having a wavelength of 405 nanometers.

The concepts outlined above are illustrated in FIGS. 3 and 4. FIG. 3 shows the diffracted signal from a plane-wave hologram written with a holographic interference pattern having a wavelength of 405 nanometers, into a PMMA film containing SIPN, diphenyliodonium triflate as the PAG, and 5,12-bis(phenylethynyl)naphthacene as the photo-sensitizer, while it is being read with a read beam having a wavelength of 405 nanometers. The irradiation with the holographic interference pattern (also called a "write beam") having a wavelength of 405 nanometers causes a partial conversion of SIPN to oxaziridine (XI) and the recording of data as a hologram in a volume element of the PMMA film. However, as seen in FIG. 4, the diffracted signal as read using the read beam, falls in intensity over time, thus showing that the stored data has only a limited lifetime. However, when the diphenyliodonium triflate is photochemically activated for release of trifluoromethanesulfonic acid, the photo-acid, the data written into the PMMA film remains essentially stable over the period used for measuring the diffracted signal by with the read beam. This is evident in FIG. 4, which shows the diffracted signal from a plane-wave hologram written as described for FIG. 3, after being further exposed to light having a wavelength of 532 nm for about 2 minutes. FIG. 4 shows that the diffracted signal being read out with a read beam having a wavelength of 405 nanometers, remains essentially unchanged over the entire test period. The irradiation at 532 nm causes diphenyliodonium triflate to release trifluoromethanesulfonic acid, which stabilizes the unconverted SIPN (presumably as the protonated nitrone), but does not effect the secondary amide products (XII) and (XIII) that may have formed by rearrangement.

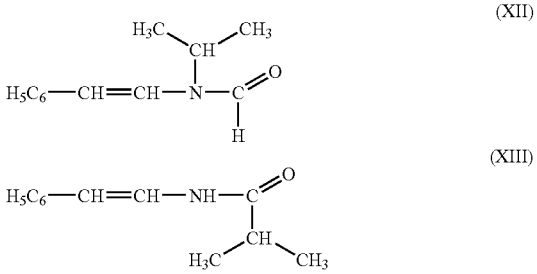

These experiments show that if the nitrone is protonated after the information is stored, the photosensitivity of the remaining nitrone dye is lowered, and the lifetime of the stored information is enhanced thereby. The protonated nitrone is shown to have a much lower sensitivity to the read/write wavelength than the initial nitrone, with the result that lifetime of the stored data will be enhanced thereby. Therefore, these observations and concepts can be utilized for storing holographic data reliably while minimizing adventitious data erasure and/or loss of data integrity.

In an embodiment, the optically transparent substrate is irradiated with a holographic interference pattern having first wavelength to record data. The optically transparent substrate is then irradiated with radiation having a second wavelength to stabilize the written data, and the stabilized data can then be read using radiation having a third wavelength (e.g., a "read beam"), wherein the radiation at each step can independently have a wavelength from about 300 nm to about 1,500 nm. In an embodiment, the first, second, and third wavelengths can be independently between about 300 nm and about 800 nm. In one embodiment, the first wavelength (or the writing wavelength) for writing and recording the data onto the holographic data storage medium is from about 375 nm to about 450 nm. In another embodiment, the first wavelength can be from about 355 nm to about 550 nm. In one embodiment, the first wavelength is in a range from about 375 nm to about 450 nm and the second wavelength is in a range from about 450 to about 1500 nm. In another embodiment, the first wavelength is in a range from about 450 nm to about 550 nm and the second wavelength is in a range from about 550 to about 1500 nm. In still another embodiment, the writing wavelength is such that it is shifted by 0 nm to about 400 nm from the wavelength at which the recorded data is stabilized by the action of light of the second wavelength on the PAG or the PAG/sensitizer combination. Exemplary wavelengths at which writing and data stabilization are accomplished are about 405 nanometers (writing) and about 532 nanometers (stabilization).

The photochemically active dye is used in an amount from about 0.1 to about 10 weight percent in an embodiment, from about 1 weight percent to about 4 weight percent in another embodiment, and from about 4 weight percent to about 7 weight percent in still another embodiment, based on a total weight of the optically transparent substrate.

Optically transparent plastic materials may be advantageously employed in the preparation of the optically transparent substrate. Optically transparent plastic materials used in producing holographic data storage media (such as the optically transparent substrate) can comprise any plastic material having sufficient optical quality, e.g., low scatter, low birefringence, and negligible losses at the wavelengths of interest, to render the data in the holographic storage material readable. Organic polymeric materials, such as for example, oligomers, polymers, dendrimers, ionomers, copolymers such as for example, block copolymers, random copolymers, graft copolymers, star block copolymers; and the like, or a combination comprising at least one of the foregoing polymers can be used. Thermoplastic polymers or thermosetting polymers can be used. Examples of suitable thermoplastic polymers include polyacrylates, polymethacrylates, polyamides, polyesters, polyolefins, polycarbonates, polystyrenes, polyesters, polyamideimides, polyaromaticates, polyaromaticsulfones, polyethersulfones, polyphenylene sulfides, polysulfones, polyimides, polyetherimides, polyetherketones, polyether etherketones, polyether ketone ketones, polysiloxanes, polyurethanes, polyaromaticene ethers, polyethers, polyether amides, polyether esters, or the like, or a combination comprising at least one of the foregoing thermoplastic polymers. Some more possible examples of suitable thermoplastic polymers include, but are not limited to, amorphous and semi-crystalline thermoplastic polymers and polymer blends, such as: polyvinyl chloride, linear and cyclic polyolefins, chlorinated polyethylene, polypropylene, and the like; hydrogenated polysulfones, ABS resins, hydrogenated polystyrenes, syndiotactic and atactic polystyrenes, polycyclohexyl ethylene, styrene-acrylonitrile copolymer, styrene-maleic anhydride copolymer, and the like; polybutadiene, polymethylmethacrylate (PMMA), methyl methacrylate-polyimide copolymers; polyacrylonitrile, polyacetals, polyphenylene ethers, including, but not limited to, those derived from 2,6-dimethylphenol and copolymers with 2,3, 6-trimethylphenol, and the like; ethylene-vinyl acetate copolymers, polyvinyl acetate, ethylene-tetrafluoroethylene copolymer, aromatic polyesters, polyvinyl fluoride, polyvinylidene fluoride, and polyvinylidene chloride.

In some embodiments, the thermoplastic polymer used in the methods disclosed herein as a substrate is made of a polycarbonate. The polycarbonate may be an aromatic polycarbonate, an aliphatic polycarbonate, or a polycarbonate comprising both aromatic and aliphatic structural units.

As used herein, the term "polycarbonate" includes compositions having structural units of the structure (XIV),

(XIV)

where $R^{11}$ is an aliphatic, aromatic or a cycloaliphatic radical. In an embodiment, the polycarbonate comprises structural units of the structure (XV):

$$-A^1-Y^1-A^2-$$ (XV)

wherein each of $A^1$ and $A^2$ is a monocyclic divalent aromatic radical and $Y^1$ is a bridging radical having zero, one, or two atoms which separate $A^1$ from $A^2$. In an exemplary embodiment, one atom separates $A^1$ from $A^2$. Illustrative, non-limiting examples of radicals of this type are —O—, —S—, —S(O)—, —S(O)$_2$—, —C(O)—, methylene, cyclohexylmethylene, 2-ethylidene, isopropylidene, neopentylidene, cyclohexylidene, cyclopentadecylidene, cyclododecylidene, adamantylidene, and the like. Some examples of such bisphenol compounds are bis(hydroxy aromatic)ethers such as 4,4'-dihydroxy diphenylether, 4,4'-dihydroxy-3,3'-dimethylphenyl ether, and the like; bis(hydroxy aromatic)sulfides, such as 4,4'-dihydroxy diphenyl sulfide, 4,4'-dihydroxy-3,3'-dimethyl diphenyl sulfide, and the like; bis(hydroxy aromatic) sulfoxides, such as, 4,4'-dihydroxy diphenyl sulfoxides, 4,4'-dihydroxy-3,3'-dimethyl diphenyl sulfoxides, and the like; bis(hydroxy aromatic)sulfones, such as 4,4'-dihydroxy diphenyl sulfone, 4,4'-dihydroxy-3,3'-dimethyl diphenyl sulfone, and the like; and combinations comprising at least one of the foregoing bisphenol compounds. In another embodiment, zero atoms separate $A^1$ from $A^2$, with an illustrative example being biphenol. The bridging radical $Y^1$ can be a hydrocarbon group, such as, for example, methylene, cyclohexylidene or isopropylidene, or aromatic bridging groups.

Any of the dihydroxy aromatic compounds known in the art can be used to make the polycarbonates. Examples of dihydroxy aromatic compounds include, for example, compounds having general structure (XVI),

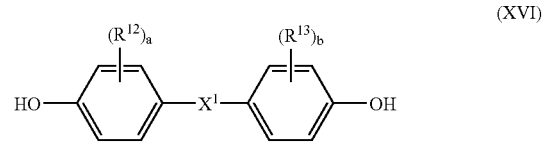

(XVI)

wherein $R^{12}$ and $R^{13}$ each independently represent a halogen atom, or an aliphatic radical, an aromatic radical, or a cycloaliphatic radical; a and b are each independently integers from 0 a to 4; and $X^1$ represents an aromatic radical, a cycloaliphatic radical, an aliphatic radical, or one of the groups having structures (XVII) or (XVIII),

(XVII)

(XVIII)

wherein $R^{14}$ and $R^{15}$ each independently represent a hydrogen atom or an aliphatic radical, an aromatic radical, or a cycloaliphatic radical; and $R^{16}$ is a divalent aromatic radical, a divalent cycloaliphatic radical, or divalent aliphatic radical. In one embodiment, $R^{16}$ is the divalent aliphatic radical $CCl_2$. In another embodiment $R^{16}$ is a divalent radical which is a hydrocarbon group. Some illustrative, non-limiting examples of suitable dihydroxy aromatic compounds include dihydric phenols and the dihydroxy-substituted aromatic hydrocarbons such as those disclosed by name or structure (generic or specific) in U.S. Pat. No. 4,217,438. Polycarbonates comprising structural units derived from bisphenol A are preferred since they are relatively inexpensive and commercially readily available. A nonexclusive list of specific examples of the types of bisphenol compounds that may be represented by structure (XVI) includes the following: 1,1-bis(4-hydroxyphenyl) methane; 1,1-bis(4-hydroxyphenyl) ethane; 2,2-bis(4-hydroxyphenyl) propane (hereinafter "bisphenol A" or "BPA"); 2,2-bis(4-hydroxyphenyl) butane; 2,2-bis(4-hydroxyphenyl) octane; 1,1-bis(4-hydroxyphenyl) propane; 1,1-bis(4-hydroxyphenyl) n-butane; bis(4-hydroxyphenyl) phenylmethane; 2,2-bis(4-hydroxy-3-methylphenyl) propane (hereinafter "DMBPA"); 1,1-bis(4-hydroxy-t-butylphenyl) propane; 2,2-bis(4-hydroxy-3-bromophenyl) propane; 1,1-bis(4-hydroxyphenyl) cyclopentane; 9,9'-bis(4-hydroxyphenyl) fluorene; 9,9'-bis(4-hydroxy-3-methylphenyl) fluorene; 4,4'-biphenol; 1,1-bis(4-hydroxyphenyl) cyclohexane;

1,1-bis(4-hydroxy-3-methylphenyl)cyclohexane (hereinafter "DMBPC"); and the like, as well as combinations comprising at least one of the foregoing bisphenol compounds.

Polycarbonates can be produced by any of the methods known in the art. Branched polycarbonates are also useful, as well as blends of linear polycarbonates and branched polycarbonates. Preferred polycarbonates are based on bisphenol A. Preferably, the weight average molecular weight of the polycarbonate is about 5,000 to about 100,000 atomic mass units, more preferably about 10,000 to about 65,000 atomic mass units, and most preferably about 15,000 to about 35,000 atomic mass units. Other specific examples of a suitable thermoplastic polymer for use in forming the holographic data storage media include Lexan®, a polycarbonate; and Ultem®, an amorphous polyetherimide, both of which are commercially available from General Electric Company.

Examples of useful thermosetting polymers include those selected from the group consisting of an epoxy, a phenolic, a polysiloxane, a polyester, a polyurethane, a polyamide, a polyacrylate, a polymethacrylate, or a combination comprising at least one of the foregoing thermosetting polymers.

The photochemically active dye may be admixed with other additives to form a photo-active material. Examples of such additives include heat stabilizers; antioxidants; light stabilizers; plasticizers; antistatic agents; mold releasing agents; additional resins; binders; blowing agents; and the like, as well as combinations of the foregoing additives. The photo-active materials are used for manufacturing holographic data storage media.

Cycloaliphatic and aromatic polyesters can be used as binders for preparing the photo-active material. These are suitable for use with thermoplastic polymers, such as polycarbonates, to form the optically transparent substrate. These polyesters are optically transparent, and have improved weatherability, low water absorption and good melt compatibility with the polycarbonate matrix. Cycloaliphatic polyesters are generally prepared by reaction of a diol with a dibasic acid or an acid derivative, often in the presence of a suitable catalyst.

Generally, the photochemically active dyes and polymers used for forming the optically transparent substrate, and the holographic data storage medium should be capable of withstanding the processing conditions used to prepare the holographic data storage medium, for example during a step in which the photochemically active nitrone, the PAG, and any additional additives which may be present are compounded with a polymer powder and subsequently molded into data storage discs.

In an embodiment, the photochemically active dye is present in an amount from about 0.1 to about 10 weight percent, based on the total weight of the optically transparent substrate, and the optically transparent substrate has a UV-visible absorbance in a range between about 0.1 and about 1 at a wavelength in a range between about 300 nm and about 800 nm. Such dyes are used in combination with other materials, such as, for example, binders to form photo-active materials, which in turn are used for manufacturing holographic data storage media. In an embodiment, a film of an optically transparent substrate comprising an optically transparent plastic material and at least one photochemically active dye is formed. Generally, the film is prepared by molding techniques using a molding composition that is obtained by mixing the dye, the PAG, and optionally the photo-sensitizer, with an optically transparent plastic material. Mixing can be conducted in machines such as a single or multiple screw extruder, a Buss kneader, a Henschel, a helicone, an Eirich mixer, a Ross mixer, a Banbury, a roll mill, molding machines such as injection molding machines, vacuum forming machines, blow molding machine, or the like, or a combination comprising at least one of the foregoing machines. Alternatively, the dye, the PAG, the photo-sensitizer, and the optically transparent plastic material may be dissolved in a solution and films of the optically transparent substrate can be formed from the solution.

In one embodiment a data storage composition comprising a photochemically active nitrone, a PAG, optionally a photo-sensitizer, and a thermoplastic polymer is injection molded to form an article that can be used for producing holographic data storage media. The injection-molded article can have any geometry. Examples of suitable geometries include circular discs, square shaped plates, polygonal shapes, or the like. The thickness of the articles can vary, from being at least 100 micrometers in an embodiment, and at least 250 micrometers in another embodiment. In yet another embodiment, the thickness of the article is at least 1000 micrometers.

The molded data storage medium thus produced can be used for producing data storage articles, which can be used for storing data in the form of holograms. The data storage medium in the data storage article is irradiated with a holographic interference pattern having a first wavelength to record at least one optically readable datum and generate at least one photo-product of the photochemically active dye. The optically readable datum is stored as a hologram patterned within at least one volume element of the data storage medium. In one embodiment, the photo-product is an aromatic oxaziridine. Then the optically readable datum is then stabilized by irradiation of the data storage medium at a second wavelength. Stabilization is achieved chemically by the release of photo-acid by the PAG or the PAG/sensitizer combination. In an embodiment, the thus-obtained stabilized holographic data can be read using radiation having a third wavelength. In an embodiment, the read wavelength can be between 350 and 1,100 nm.

The methods disclosed herein can be used for producing holographic data storage media that can be used for bit-wise type data storage in an embodiment, and page-wise type storage of data in another embodiment. In still another embodiment, the methods can be used for storing data in multiple layers of the data storage medium. In view of the various photochemical transformations occurring with the nitrones during the data recording processes disclosed herein, it becomes possible to identify a holographic data storage medium, or a holographic data storage article comprising such a data storage medium, in terms of the chemical entities present before and after the data storage process. Thus in an embodiment, the present invention provides for a holographic data storage medium that can be used for storing data in the form of holograms. Such a data storage medium comprises (i) at least one optically transparent plastic material, (ii) at least one photochemically active dye, (iii) at least one photo-acid generator, and (iv) optionally at least one photo-sensitizer.

In another embodiment, the present invention provides for a data storage medium having at least one optically readable datum stored therein. Such a data storage medium comprises: (i) at least one optically transparent plastic material, (ii) at least one photochemically active dye, (iii) at least one photo-acid, (iv) at least one photo-product derived from the photochemically active dye, (v) at least one photo-stable product derived from the at least one photochemically active dye, the at least one photo-product, or combinations thereof; and (vi) optionally at least one photo-sensitizer; wherein the at least one optically readable datum is stored as a hologram in the data storage medium, as discussed previously.

EXPERIMENTAL SECTION

Example 1

Preparation of α-(4-dimethylamino)styrenyl-N-phenyl nitrone (XIX). To a 1-liter, 3-necked round-bottomed flask equipped with a mechanical stirrer and a nitrogen inlet was added phenylhydroxyamine (27.3 grams, 0.25 mole), (4-dimethylamino)cinnamaldehyde (43.81 grams, 0.25 mole), and ethanol (250 milliliters). To the resulting bright orange slurry was added methanesulfonic acid (250 microliters) via a syringe. The bright orange slurry turned to a deep red and all solids dissolved. Within five minutes, an orange solid formed. Pentane (about 300 milliliters) was added to facilitate stirring of the reaction mixture. The solid was filtered and dried in a vacuum oven at 80° C. for several hours to give 55.9 grams (84 percent of theory) of the desired product as a bright orange solid. The product nitrone dye has structure (XIX):

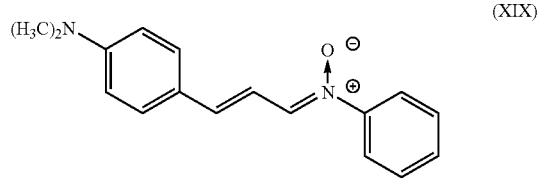

(XIX)

Example 2

Preparation of α-styrenyl-N-isopropyl nitrone (Compound XX). N-Isopropylhydroxylamine hydrochloride (5.04 grams, 45.2 millimoles, 1 molar equivalent; available from Acros Organics) was combined with trans-cinnamaldehyde (5.66 grams, 42.9 millimoles, 0.95 molar equivalent; available from Aldrich Chemical Company) in 16 milliliters of water. Initially, the mixture was an emulsion due to the low solubility of the trans-cinnamaldehyde. After being stirred rapidly for about one hour, the emulsion disappeared, and a homogeneous light yellow solution resulted. After being stirred for four hours, the reaction mixture was poured into methylene chloride and treated with 26 milliliters of saturated aqueous sodium carbonate solution until the pH was about 10.5. The phases were separated and the aqueous phase was extracted with additional methylene chloride. The combined organic phases were separated, dried over anhydrous magnesium sulfate, concentrated in vacuo, and the residue dried under vacuum overnight to produce 7.4 grams (91 percent of theory) of the desired product nitrone that was determined to be pure by liquid chromatography and further characterized by NMR spectroscopy. UV-visible spectrum of the product in absolute ethanol revealed an absorption maximum ($\lambda_{max}$) at 330 nanometers. Exposure of this dilute solution to a 390 nanometer light source converted the nitrone to the corresponding oxaziridine with a shift of the absorption maximum to 256 nanometers. All sample manipulations were done in a dark room containing only red light to insure the stability of the nitrone product.

Example 3

This Example describes the procedure for preparing α-(4-dimethylamino)styrenyl-N-phenyl nitrone-polystyrene blends, and molded disks having a thickness of about 1.2 millimeters. Ten kilograms of crystalline polystyrene 1301 pellets (obtained from Nova Chemicals) were ground to a coarse powder in a Retsch mill and dried in a circulating air oven maintained at 80° C. for several hours. In a 10-liter Henschel mixer, 6.5 kilograms of the dry polystyrene powder and 195 grams of α-(4-dimethylamino)styrenyl-N-phenyl nitrone were blended to form a homogeneous orange powder. The powder blend was then fed to a WP 28 millimeter twin-screw extruder at 185° C. to give 6.2 kilograms of dark orange pellets with a nominal nitrone dye content of about 3 weight percent. This material was then further diluted with additional crystal polystyrene 1301 pellets to make additional blends having 0.60 weight percent, 0.75 weight percent, 1 weight percent, and 1.24 weight percent α-(4-dimethylamino)styrenyl-N-phenyl nitrone. Each of these four blend compositions was then re-processed with the WP 28 millimeter twin-screw extruder to form homogeneously colored pellets.

Optical quality disks were prepared by injection molding the four blends (prepared as described above) with an ELECTRA DISCO™ 50-ton all-electrical commercial CD/DVD (compact disc/digital video disc) molding machine (available from Milacron Inc.). Mirrored stampers were used for both surfaces. Cycle times were generally set to about 10 seconds. Molding conditions were varied depending upon the glass transition temperature and melt viscosity of the polymer used, as well as the photochemically active dye's thermal stability. Thus the maximum barrel temperature was varied from about 200° C. to about 375° C.

Example 4

Procedure for preparing molded disks using a Mini-jector® apparatus. The molding conditions varied depending upon the nature of the polymer matrix used. Typical conditions used for molding OQ (Optical Grade) polycarbonate and polystyrene based blends comprising the photochemically active nitrones are shown in Table 2.

TABLE 2

| Molding Parameters | OQ Polycarbonate Powder | Polystyrene Powder |
|---|---|---|
| Barrel Temp. (Rear) (° F.) | 500 | 400 |
| Barrel Temp. (Front) (° F.) | 540 | 395 |
| Barrel Temp. (Nozzle) (° F.) | 540 | 395 |
| Mold Temp. (° F.) | 200 | 100 |
| Total Cycle Time (sec) | 35 | 25 |
| Switch Point (inch) | 0.7 | 0.7 |
| Injection Transition (inch) | 0.22 | 0.22 |
| Injection Boost Press. (psi) | 950 | 850 |
| Injection Hold Press. (psi) | 300 | 250 |

UV-visible spectra of the photochemically active nitrones were recorded on a Cary/Varian 300 UV-visible spectrophotometer using either a solution of the nitrone in a suitable solvent, such as acetonitrile; or comprised within a polymer film.

Example 5

This Example describes a method for preparing a polymer film that can be used as a holographic data storage medium. The Example serves as a control experiment in which a hologram was written into a polymer film comprising a PAG, a photo-sensitizer, and a photochemically active dye, but wherein the hologram was written at a first wavelength that does not result in formation of a photoacid.

All handling of the compounds described was performed under protection from light or under red-light conditions. A solution of 2 grams of optical quality poly(methyl methacrylate) (PMMA) in 10 milliliters of dichloromethane was prepared. 2 milliliters of this solution was placed in an amber vial and 15 milligrams of diphenyliodonium triflate (Aldrich Chemicals, CAS number: 66003-76-7) was added as the PAG. 3 Milligrams of the photo-sensitizer 5,12-bis(phenylethynyl)naphthacene (Aldrich Chemicals, CAS number: 18826-29-4) was added and dissolved. Finally, 2 milligrams of α-styrenyl isopropyl nitrone (CAS number: 117458-05-6) was then added. The resulting solution was then solvent cast onto a glass slide to form a film about 100 microns thick and the film was dried under a slight vacuum for 24 hours. A planewave hologram was written into the dried film using a 405 nanometer set-up with a diffraction efficiency of about 3 percent. The decay of the diffracted signal from the hologram, was monitored over a time-frame of about 100 seconds by using a 405 nanometer reading laser beam, is shown in FIG. 3.

Example 6

This Example illustrates the manner in which the lifetime of data stored in the holographic storage medium prepared as described in Example 5 was enhanced when the PAG and photo-sensitizer was activated photochemically by irradiating the film comprising the PAG and the photo-sensitizer at a second wavelength.

A new film sample was prepared as described in Example 5, and a hologram was written using radiation having a wavelength of 405 nanometers in a manner identical to that described previously. The written datum was exposed briefly to an un-focused laser beam having a wavelength of 532 nanometers (100 milliwatts over a 5 square millimeter area). The decay of diffracted signal from the hologram was then monitored using a 405-nanometer reading laser beam, as shown in FIG. 4. FIG. 4 shows that the signal from the diffracted beam does not decay over the observation time-frame used in Example 5.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

The invention claimed is:

1. A method for storing holographic data, said method comprising:
   providing an optically transparent substrate comprising a photochemically active dye and a photo-acid generator;
   irradiating the optically transparent substrate with a holographic interference pattern, wherein the pattern has a first wavelength and an intensity both sufficient to convert, within a volume element of the substrate, at least some of the photochemically active dye into a photo-product, and producing within the irradiated volume element concentration variations of the photo-product corresponding to the holographic interference pattern, thereby producing an optically readable datum corresponding to the volume element; and
   irradiating the optically transparent substrate at a second wavelength and intensity sufficient to activate the photo-acid generator to stabilize the optically readable datum;
   wherein the photochemically active dye is a photochemically active nitrone having a structure (I):

wherein $R^1$ is an aliphatic radical, a cycloaliphatic radical, or an aromatic radical that is capable of conjugating with the nitrone group; $R^2$ is hydrogen or an aliphatic radical, a cycloaliphatic radical, or an aromatic radical that is capable of conjugating with the nitrone group; and $R^3$ is an aliphatic radical, a cycloaliphatic radical, or an aromatic radical.

2. The method of claim 1, wherein $R^2$ and $R^3$ taken together form part of a ring structure.

3. The method of claim 1, wherein $R^1$ has a structure (II):

wherein each of $R^4$, $R^5$, and $R^6$ is independently a hydrogen atom, an aliphatic radical, a cycloaliphatic radical, or an aromatic radical; and "n" is an integer having a value of from 1 to 4.

4. The method of claim 3, wherein the photochemically active nitrone is a nitrone having structure (III):

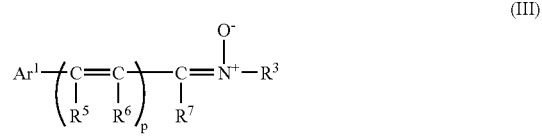

wherein $Ar^1$ is an aromatic radical, each of $R^5$, $R^6$, and $R^7$ is independently a hydrogen atom, an aliphatic radical, a cycloaliphatic radical, or an aromatic radical; $R^3$ is an aliphatic radical, a cycloaliphatic radical, or an aromatic radical, and "p" is an integer having a value of from 0 to 4.

5. The method of claim 1, wherein the photochemically active nitrone is an aromatic nitrone selected from the group consisting of α-styrenyl isopropyl nitrone (SIPN), α-(4-diethylaminophenyl)-N-phenylnitrone; α-(4diethylaminophenyl)-N-(4-chlorophenyl)-nitrone, α-(4-diethylaminophenyl)-N-(3,4-dichlorophenyl)-nitrone, α-(4-diethylaminophenyl)-N-(4-carbethoxyphenyl)-nitrone, α-(4-diethylaminophenyl)-N-(4-acetylphenyl)-nitrone, α-(4-dimethylaminophenyl)-N-(4-cyanophenyl)-nitrone, α-(4-methoxyphenyl)-N-(4-cyanophenyl)nitrone, α-(9-julolidinyl)-N-phenylnitrone, α-(9-julolidinyl)-N-(4-chlorophenyl)nitrone, α-(4-dimethylamino)styrenyl-N-phenyl nitrone, α-styrenyl-N-phenyl nitrone, α-[2-(1,1-diphenyletheny)]-N-phenylnitrone, α-[2-(1-phenylpropenyl)]-N-phenylnitrone, and combinations thereof.

6. The method of claim 1 wherein the photo-product is an oxaziridine.

7. The method of claim 1, wherein the photo-product is an aromatic oxaziridine.

8. The method of claim 7, wherein the aromatic oxaziridine has structure (V):

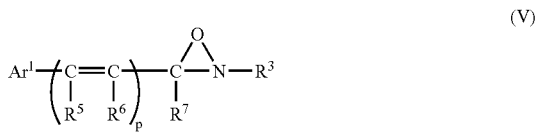

wherein $Ar^1$ is an aromatic radical, each of $R^5$, $R^6$, and $R^7$ is independently a hydrogen atom, an aliphatic radical, a cycloaliphatic radical, or an aromatic radical; $R^3$ is an aliphatic radical, an aromatic radical, or a cycloaliphatic radical; and "p" is an integer having a value of from 0 to 4.

9. The method of claim 1, wherein the step of irradiating the optically transparent substrate at the second wavelength and intensity sufficient to activate the photo-acid generator affords a photo-stable protonated nitrone.

10. The method of claim 1, wherein the step of irradiating the optically transparent substrate at the second wavelength and intensity sufficient to activate the photo-acid generator affords a photo-stable amide.

11. The method of claim 10, wherein the photo-stable amide is selected from the group consisting of aromatic amides having structures (VII), (VIII):

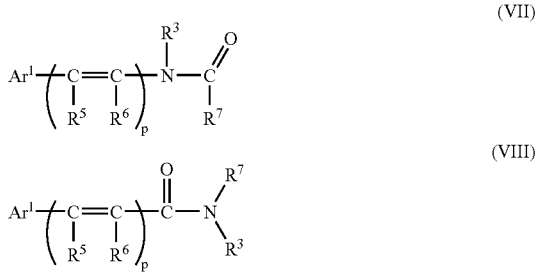

and combinations thereof, wherein $Ar^1$ is an aromatic radical, each of $R^5$, $R^6$, and $R^7$ is independently a hydrogen atom, an aliphatic radical, a cycloaliphatic radical, or an aromatic radical; $R^3$ is an aliphatic radical, an aromatic radical, or a cycloaliphatic radical; and "p" is an integer having a value of from 0 to 4.

12. The method of claim 11, wherein the photo-stable amide is a formamide having structure (IX):

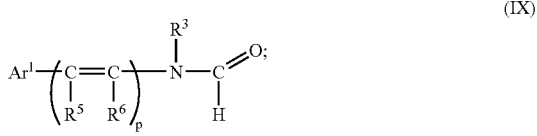

wherein $Ar^1$ is an aromatic radical, each of $R^5$ and $R^6$ is independently a hydrogen atom, an aliphatic radical, a cycloaliphatic radical, or an aromatic radical; $R^3$ is an aliphatic radical, an aromatic radical, or a cycloaliphatic radical; and "p" is an integer having a value of from 0 to 4.

13. The method of claim 1, wherein the photo-acid generator comprises an onium salt.

14. The method of claim 13, wherein the onium salt is selected from the group consisting of an iodonium salt, a sulfonium salt, a selenonium salt, a phosphonium salt, an N-alkoxypyridinium salt, and combinations thereof.

15. The method of claim 1, wherein the photo-acid generator is selected from the group consisting of diaryliodonium tetrafluoroborates, diaryliodonium hexafluorophosphates, diaryliodonium hexafluoroantimonates, diaryliodonium trifluoromethanesulfonates, and combinations thereof.

16. The method of claim 1, wherein the optically transparent substrate further comprises at least one photo-sensitizer.

17. The method of claim 16, wherein the photo-sensitizer is selected from the group consisting of a polymeric phenothazine, a homopolymer of N-vinylcarbazole, a copolymer of N-vinylcarbazole, a phenothiazine compound, an anthracene compound, a naphthacene compound, a porphyrin compound, a phthalocyanine compound, a naphthalocyanine compound, a chalcogenapyrilium nitrone compound, a merocyanine nitrone compound, a quasiaromatic heterocyclic compound, a Nile Blue nitrone compound, a metal-bipyridine complex, and combinations thereof.

18. The method of claim 1, wherein said first wavelength is from about 375 nanometers to about 450 nanometers.

19. The method of claim 1, wherein said first wavelength is from about 450 nanometers to about 550 nanometers.

20. The method of claim 18, wherein said second wavelength is longer than the first wavelength, and the second wavelength is from about 450 nanometers to about 1500 nanometers.

21. The method of claim 19, wherein said second wavelength is longer than the first wavelength, and the second wavelength is from about 550 nanometers to about 1500 nanometers.

22. A method for storing holographic data, said method comprising:

providing an optically transparent substrate comprising a photochemically active nitrone, a photo-acid generator, and a photo-sensitizer;

irradiating the optically transparent substrate with a holographic interference pattern, wherein the pattern has a first wavelength and an intensity both sufficient to convert, within a volume element of the substrate, at least some of the photochemically active nitrone into a photo-product of the photochemically active nitrone, and producing within the irradiated volume element concentration variations of the photo-product corresponding to the holographic interference pattern, thereby producing a first optically readable datum corresponding to the volume element; and irradiating the modified optically transparent substrate at a second wavelength and intensity sufficient to activate the photo-acid generator to stabilize the optically readable datum;

wherein the photochemically active dye is a photochemically active nitrone having a structure (I):

wherein $R^1$ is an aliphatic radical, a cycloaliphatic radical, or an aromatic radical that is capable of conjugating with the nitrone group; $R^2$ is hydrogen or an aliphatic radical, a cycloaliphatic radical, or an aromatic radical that is capable of conjugating with the nitrone group; and $R^3$ is an aliphatic radical, a cycloaliphatic radical, or an aromatic radical.

23. An optical writing/reading method, comprising:

irradiating with a holographic interference pattern an optically transparent substrate that comprises a photochemically active dye and a photo-acid generator, wherein the pattern has a first wavelength and an intensity both sufficient to convert, within a volume element of the substrate, at least some of the photochemically active dye into a photo-product, and producing within the irradiated volume element concentration variations of the photo-product corresponding to the holographic interference pattern, thereby producing a first optically readable datum corresponding to the volume element; wherein the holographic interference pattern is produced by simultaneously irradiating the optically transparent substrate with a signal beam corresponding to data and a reference beam that does not correspond to data;

irradiating the optically transparent substrate at a second wavelength and intensity sufficient to activate the photo-acid generator to stabilize the optically readable datum; and irradiating the optically transparent substrate with a read beam and reading the optically readable datum by detecting diffracted light;

wherein the photochemically active dye is a photochemically active nitrone having a structure (I):

wherein $R^1$ is an aliphatic radical, a cycloaliphatic radical, or an aromatic radical that is capable of conjugating with the nitrone group; $R^2$ is hydrogen or an aliphatic radical, a cycloaliphatic radical, or an aromatic radical that is capable of conjugating with the nitrone group; and $R^3$ is an aliphatic radical, a cycloaliphatic radical, or an aromatic radical.

24. The method of claim 23, wherein the read beam has a wavelength that is shifted by 1 nanometer to about 400 nanometers from the signal beam's wavelength.

25. The method of claim 23, wherein the first wavelength, the second wavelength and the read beam all have different wavelengths.

26. The method of claim 23, wherein the optically transparent substrate further comprises at least one photo-sensitizer.

* * * * *

UNITED STATES PATENT AND TRADEMARK OFFICE
CERTIFICATE OF CORRECTION

PATENT NO. : 7,524,590 B2 Page 1 of 1
APPLICATION NO. : 11/296246
DATED : April 28, 2009
INVENTOR(S) : Erben et al.

It is certified that error appears in the above-identified patent and that said Letters Patent is hereby corrected as shown below:

Title Page;

On Page 2, in Field (56), under "OTHER PUBLICATIONS", in Column 2, Line 14, delete "fro" and insert -- for --, therefor.

In Column 6, Line 11, delete "(i.e., $H_2C_6H_{10}$-)," and insert -- (i.e., $H_2NC_6H_{10}$-), --, therefor.

In Column 6, Line 24, delete "bonylcyclohex-l--yloxy" and insert
-- bonylcyclohex-l-yloxy --, therefor.

In Column 14, Line 23, delete "phenothazines," and insert -- phenothiazines, --, therefor.

In Column 26, Lines 56-57, in Claim 5, delete "α-(4diethylaminophenyl)" and insert -- α-(4-diethylaminophenyl) --, therefor.

In Column 28, Lines 15-16, in Claim 17, delete "phenothazine," and insert -- phenothiazine, --, therefor.

Signed and Sealed this

Seventh Day of July, 2009

JOHN DOLL
*Acting Director of the United States Patent and Trademark Office*